Jan. 22, 1952     G. HARTEMANN     2,583,049
DROP HAMMER

Filed July 13, 1950     9 Sheets-Sheet 1

GEORGES HARTEMANN
INVENTOR

Campbell, Brumbaugh, Free & Graves
HIS ATTORNEYS

Jan. 22, 1952   G. HARTEMANN   2,583,049
DROP HAMMER

Filed July 13, 1950   9 Sheets-Sheet 3

GEORGES HARTEMANN
INVENTOR

Campbell, Brumbaugh, Free and Graves
HIS ATTORNEYS

Jan. 22, 1952     G. HARTEMANN     2,583,049
DROP HAMMER

Filed July 13, 1950     9 Sheets-Sheet 4

GEORGES HARTEMANN
INVENTOR

HIS ATTORNEYS

Jan. 22, 1952  G. HARTEMANN  2,583,049
DROP HAMMER
Filed July 13, 1950  9 Sheets-Sheet 5

GEORGES HARTEMANN
INVENTOR

Campbell, Brumbaugh, Free & Graves
HIS ATTORNEYS

Jan. 22, 1952 G. HARTEMANN 2,583,049
DROP HAMMER
Filed July 13, 1950 9 Sheets-Sheet 7

GEORGES HARTEMANN
INVENTOR

Campbell, Brumbaugh, Free & Graves
HIS ATTORNEYS

Jan. 22, 1952    G. HARTEMANN    2,583,049
DROP HAMMER

Filed July 13, 1950    9 Sheets-Sheet 8

GEORGES HARTEMANN
INVENTOR
Campbell, Brumbaugh, Free & Graves,
HIS ATTORNEYS

Jan. 22, 1952     G. HARTEMANN     2,583,049
DROP HAMMER
Filed July 13, 1950     9 Sheets-Sheet 9
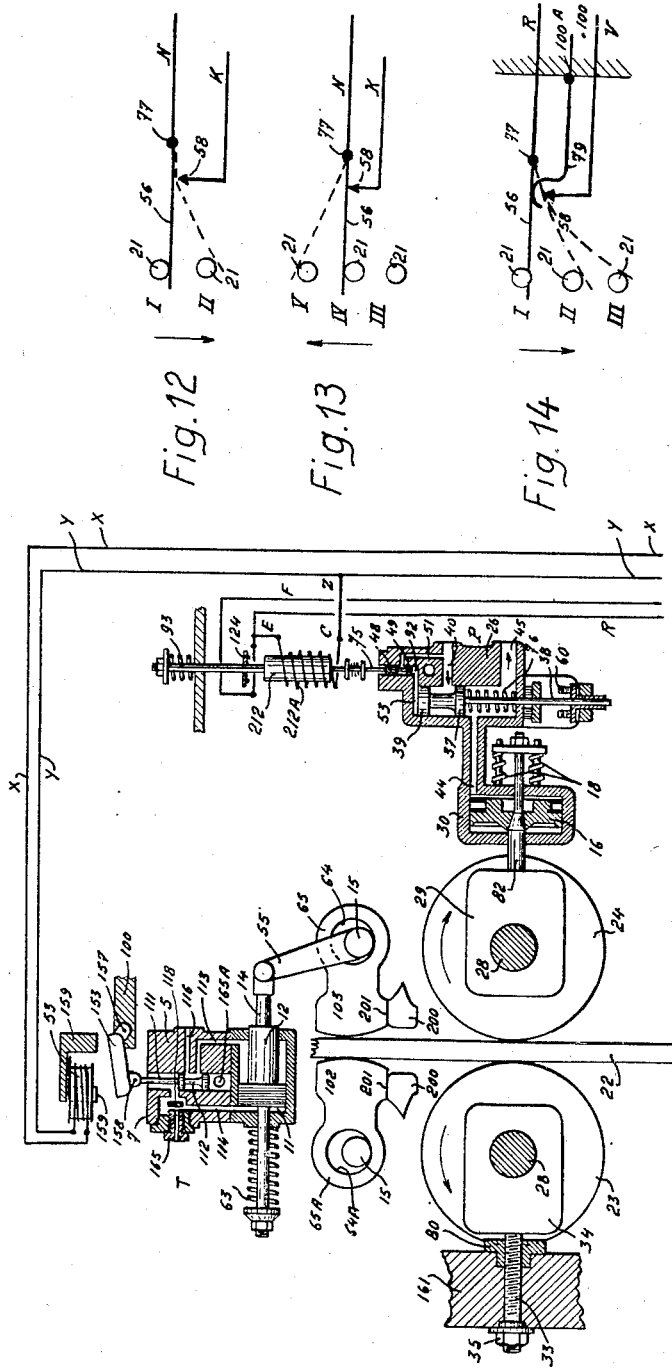
GEORGES HARTEMANN
INVENTOR
HIS ATTORNEYS Patented Jan. 22, 1952

2,583,049

UNITED STATES PATENT OFFICE 2,583,049

DROP HAMMER

Georges Hartemann, Montbard, France, assignor to Societe Anonyme Louvroil Montbard Aulnoye, Paris, France Application July 13, 1950, Serial No. 173,511
In France December 17, 1949

5 Claims. (Cl. 78—29)

This invention relates to drop hammers with electro-pneumatic control, such drop hammers being useful in stamping, forging and like operations. In these machines it is desirable to be able to regulate at will the point at which the mass or head, striking the work piece at the end of its fall, is taken up and raised again to a desired height by power means, and the point at which the head ceases to be raised and is permitted to fall under its own weight upon the work piece.

One object of the invention is to enable the head to be permitted to fall from two different heights, each of which is regulated at will, without the necessity of stopping operations in order to change from a fall, or series of falls, of greater height to a fall or series of falls of lesser heights, or inversely.

The term 'heavy blows' may designate those which correspond to falls from a greater height and the term 'light blows' those which correspond to falls from a lesser height. If it is desired to strike one or several heavy blows followed immediately by one or several light blows and then immediately to return to one or several heavy blows, this is possible without the necessity of retaining the head in an arrested position.

This result is attained, in accordance with the invention, by providing the head with a member, such as a finger, which, during the descent and ascent, acts upon three contact devices which are adjustably mounted at three different heights. The lowest contact device is arranged in the neighbourhood of the point from which the head is raised and serves for bringing about the raising. The intermediate contact determines the fall from a medium height for the striking of light blows and the highest contact determines the fall from the greater height for the striking of heavy blows.

The raising of the head is performed by rollers constantly revolving near to respective sides of the means suspending the head, which rollers are forced by electro-pneumatic means one towards the other to nip the suspension means between them when the aforesaid finger engages the lowest contact.

The fall of the head is brought about by separating the rollers and releasing the suspension means, such separation being performed by the electric-pneumatic means when the said finger engages one or other of the two elevated contact devices.

A further object of the invention is to provide means under control of the operator for making active either the one or the other of the elevated contact devices, so that the contact device selected will bring about operation of the electro-pneumatic means.

Brake jaws operated by a second electro-pneumatic means act upon the said suspension means to hold the latter fast for arresting the head when the machine is to remain idle.

Yet another object of the invention is to provide a machine of the kind in question wherein a pedal which controls the brake jaws is also effective for controlling at the same time a stud or electric contact which makes active either the contact device engaged by the finger at the greater height or the contact device at the lesser height.

Other objects will appear from the description of examples illustrated in the annexed drawings, wherein:

Figure 11 shows on a larger scale the parts seen in the upper portion of Figure 6.

Figures 12, 13, 14 and 15 are diagrams illustrating the operation of electric contact devices under the influence of engagement by the finger carried by the drop head.

Figure 1:
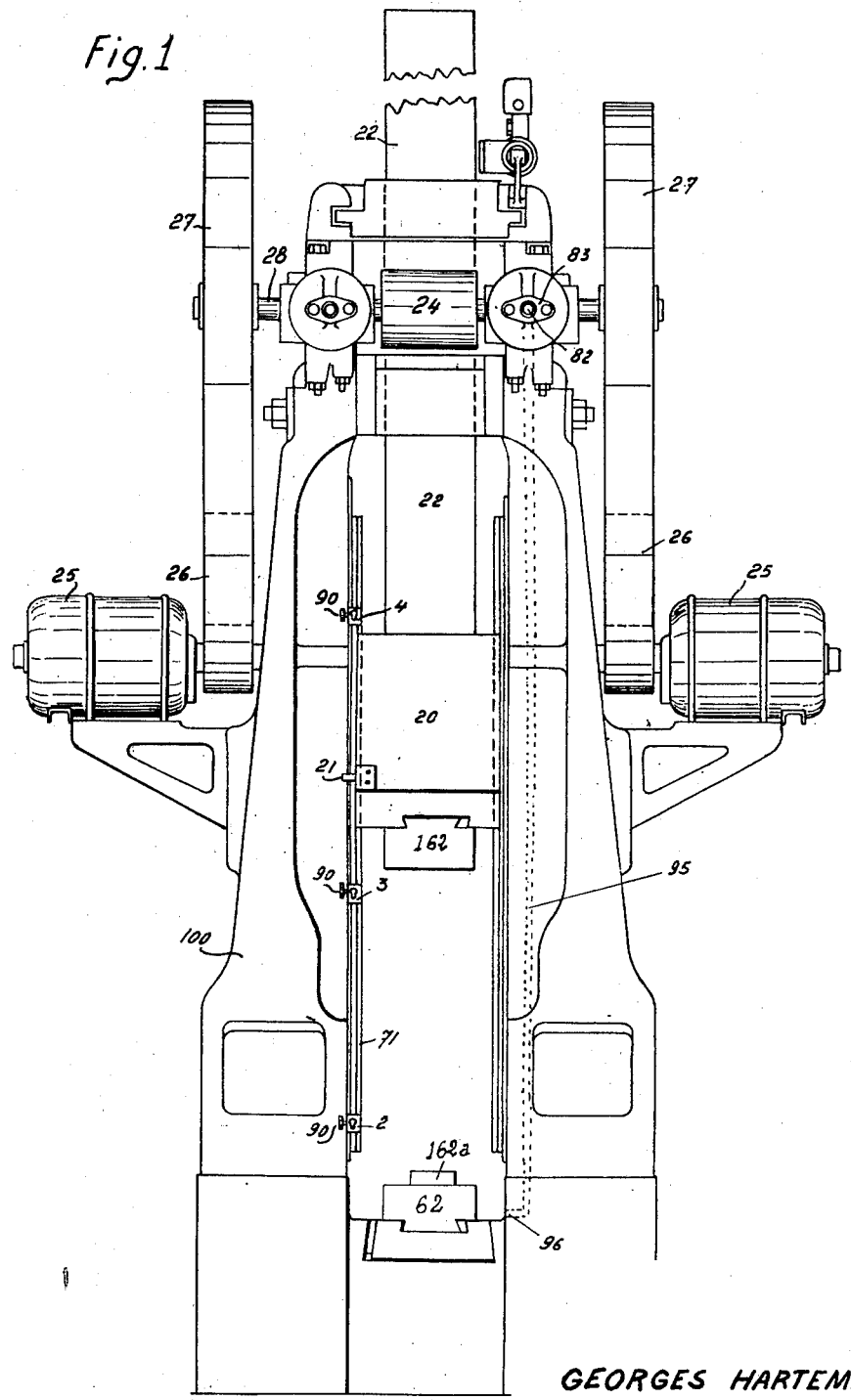
Figure 1 is a front elevation of a drop hammer adapted for operation in accordance with the present invention.

Referring to Figure 1, the drop hammer comprises a drop head 20 fitted with an upper die 162. This head is permitted to fall upon a piece 162a placed in a lower matrix 62 supported by an anvil. The head 20 automatically controls its own rising and falling through the medium of a finger 21, for example, carried by said head and engaging with electrical contact devices 2, 3 and 4. These contact devices are adjustable as to height so as to permit of very precise regulation of the moments when the head commences to rise and to fall. In Figure 1, the contact devices 2, 3 and 4 are shown mounted on a slide 71 upon which they can be fixed in desired positions of vertical adjustment by clamping screws 90.

In accordance with the invention, either one of two contact devices may be made active for determining the fall of the head. The first contact device 4, is disposed in the neighbourhood of the upper limit of the stroke and serves to determine the normal full-height drop, for example for stamping with heavy blows. The second contact device 3 is disposed at a level considerably less elevated and serves to determine a much shorter drop for light blows which may serve for example for trimming the stamped work piece.

In a general manner, the operation of the machine is as follows: The drop head 20 is attached in known manner to a strip, plate or thick belt 22, hereinafter called "the suspender," which can be nipped between two revolving rollers 23 and 24, Figures 1, 3, 4 and 6, when the one roller is moved towards the other. These rollers are continuously driven, for example by motors 25, Figure 1, through the medium of belts 26 running over pulleys 27 keyed on the shafts 28 of the rollers. As will be understood from Figure 3, the axis of the roller 23 is adjusted so that the periphery of this roller is against the suspender 22.

Figure 3:
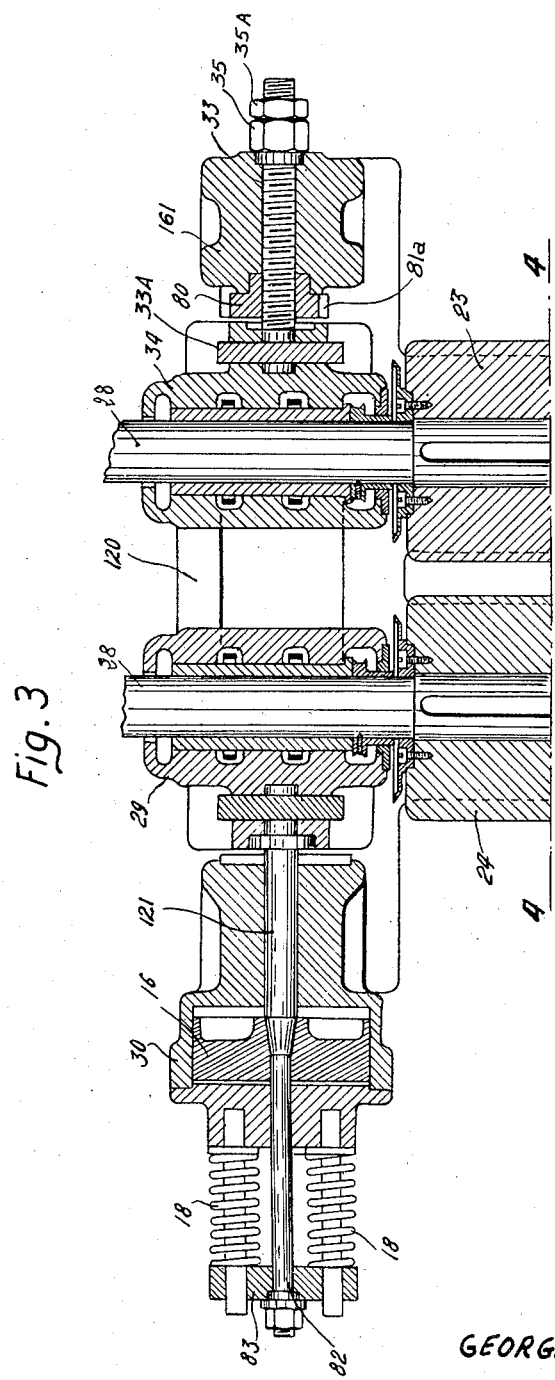
Figure 3 is a half cross section to a much larger scale, the section being taken horizontally on the line 3—3 in Figure 2.
Figure 4:
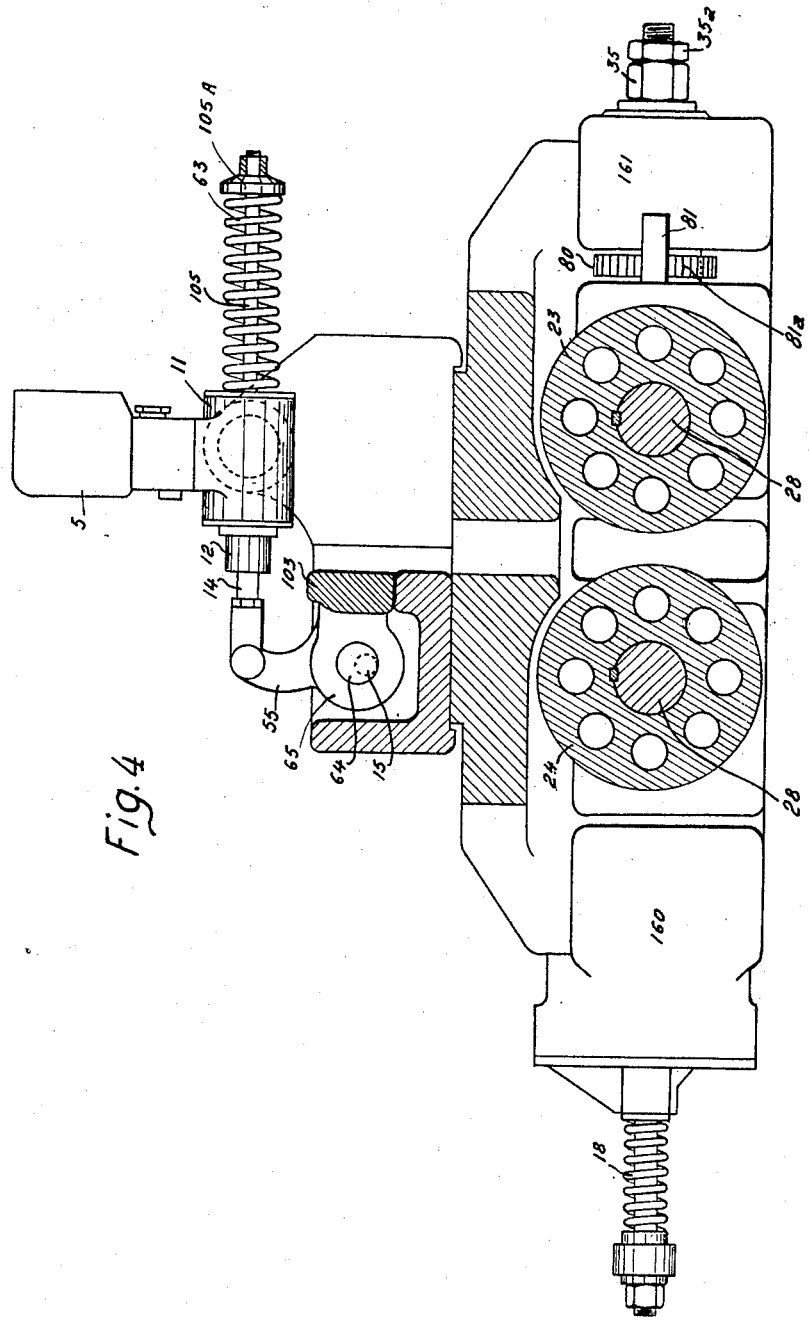
Figure 4 is a side elevation of parts in Figure 3 as seen from the lower side of the latter, the rollers being shown in section on the line 4—4 of Figure 3 and other parts being shown in section for sake of clearness.
Figure 6:
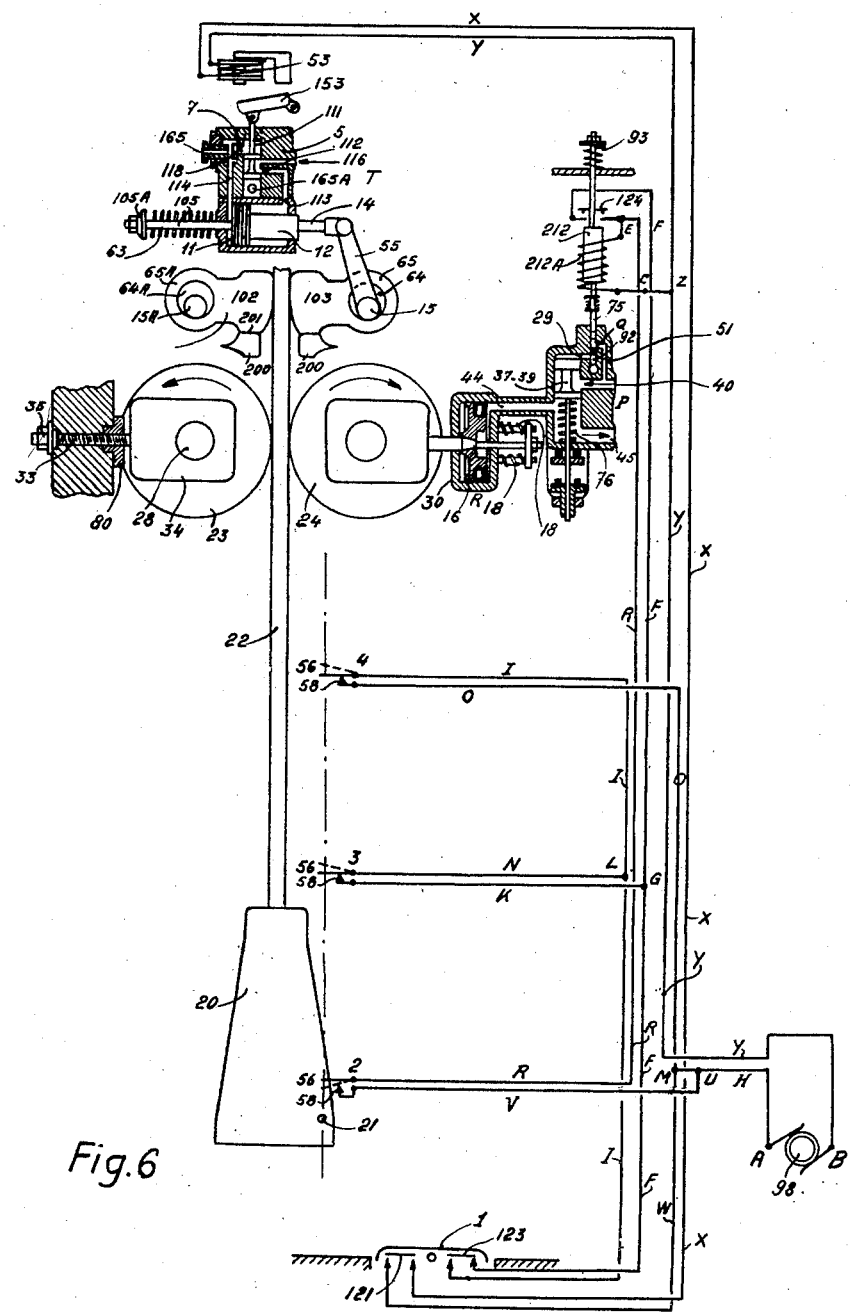
Figure 6 is a diagrammatic sectional elevation showing the raising and braking means for the drop head and the electro-penumatic means necessary for controlling the said means.

The axis of the roller 24, as will be seen from Figures 3 and 6, is movable away from and towards the suspender 22 by means of a spring-loaded pneumatic piston 16 the rod 82 of which is connected with a bearing 29 for the shaft 28 of the roller 24. The bearing 29 is movable upon a slide 120. As the piston 16 is moved one way or the other in the cylinder 30, so the axis of the roller 24 is caused to approach or move away from the suspender 22, whereby the said roller is caused either to nip the suspender 22 between itself and the roller 23 or to release the said suspender. When the suspender is nipped, it is moved upwards by the rollers revolving in the direction of the arrows in Figure 6, thus elevating the drop head 20. On the contrary, when the roller 24, is moved away from the roller 23, the drop head 20 falls under its own weight.

The piston 16 is normally moved leftward, in Figure 3 by the springs 18 to release the roller 24 from the suspender 22. Its movement in the opposite direction to bring about nipping of the suspender is caused by an admission of compressed air to the cylinder 30 under control of a pneumatic distributor. The latter is controlled by electric relays which, in turn, are controlled by the contact devices 2, 3 and 4. A control arrangement of this kind will be hereinafter described.

For maintaining the drop head in its elevated position between two stamping operations a brake arrangement comprising two jaws 102, 103, Figure 6, is provided, these jaws being operative against the suspender 22. The jaw 103 is operatable so that it can be caused to move away from or towards the suspender 22. For this purpose, the jaw 103 is formed with an eye 65 in which turns an eccentric 64 keyed upon an axle 15 which can turn in a bearing in the frame of the machine. Upon the axle 15 there is keyed a crank arm 55 which is articulated to a rod 14 of a piston 12 movable in a cylinder 11. The piston 12 is influenced towards the left in Figure 6 by a spring 63 bearing with one end against the end of the cylinder 11 and with the other end against a washer 105A fixed at the outer extremity of a rod 105 as seen also in Figure 4. The other end of the rod 105 is passed tightly through the end wall of the cylinder 11 and is attached to the piston 12. The piston 12 can be moved towards the right in Figure 6 by compressed air entering the cylinder 11 under control of a distributor T actuated by an electro-magnet 53. The energizing and de-energizing of the electro-magnet 53 is controlled by a pedal 1 requiring little effort. This mechanism is described later on in detail. When the machine is at rest, the piston 12 is moved to the end of its leftward stroke by the spring 63 and the brake is applied. It is relieved by the operator depressing the pedal 1.

Figure 2:
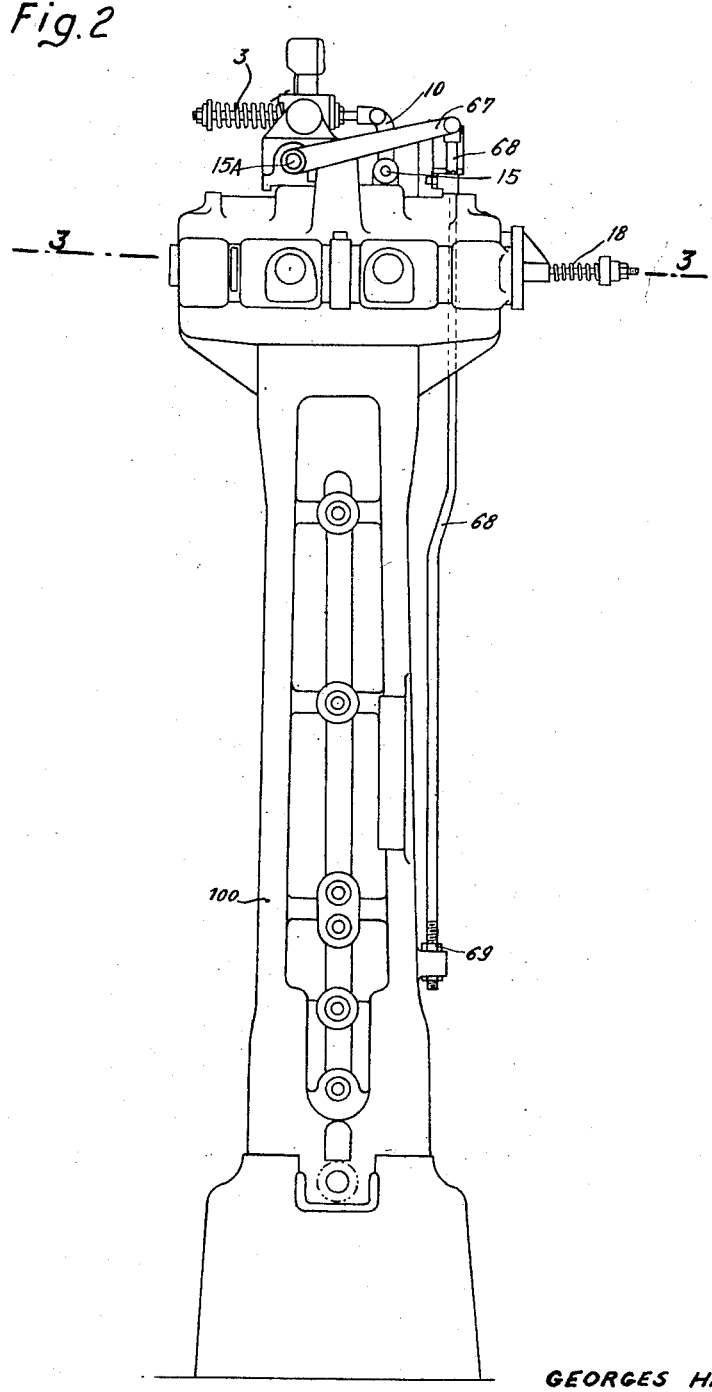
Figure 2 is a diagrammatic side elevation illustrating certain parts seen in front elevation in Figure 1.

The jaw 102 is not affected by exercise of the brake control but its position can be adjusted. For this purpose, it is furnished with an eye 65A in which turns an eccentric 64A keyed upon an axle 15A turning in a bearing in the frame of the machine. The axle 15A can be turned by a lever arm 67, Figure 2, keyed to the axle 15A and having its outer end articulated to a rod 68 which extends downwards and has a screw threaded end which passes through a boss on the frame, adjusting nuts being screwed on the said end above and below the boss. It will be apparent from Figure 2 that the rod 68 can be adjusted up or down and that the consequent upward or downward swing of the arm 67 will turn the eccentric 64A, Figure 6, for moving the jaw 102 from or towards the suspender 22.

The jaws 102, 103 rest upon respective stops 200 rigid with the frame, plane faces of the jaws bearing upon plane faces 201 of the stops. These faces guide the jaws 102, 103 in their movements perpendicularly to the suspender 22. Moreover, the said stops prevent the jaws from being pulled downwardly when engaged with the said suspender. As seen clearly from Figures 6 and 11, the curved edges of the jaws engaging the suspender 22 are eccentric, whereby the pull of the suspender 22 due to the weight of the head 20 tends to cause the jaws 102, 103 to tighten their grip on the suspender. However, if the suspender 22 is fed upwardly by the rollers 23, 24, the jaws pivot upwardly about their eccentrics 64, 64A and, by reason of the form of the said edges, cease to grip the suspender 22 so that the latter can rise freely even if the jaws are in their gripping position.

When the operator presses upon the pedal 1, the brake jaw 103 disengages and the head 20 falls as will be explained later. When the finger 21 on the head 20 touches the contact device 2, the roller 24 is caused to approach the roller 23, also as will be explained, and the head 20 is again raised until the moment when the finger 21 touches the contact device 4 (supposing that the contact device 4 is active) whereupon the roller 24 is moved outwardly and the head 20 again falls, and so on.

However, if it is desired for the head 20 to fall from a lesser height, the contact device 3 is cut into circuit and made active instead of the contact device 4 by a mechanism which will be described, with the result that the up and down movements of the head 20 will be between the contact device 2 and the contact device 3.

The control mechanisms of the brake jaw 103 and of the roller 24, as well as the electric circuits therefor, will now be described in detail. Figures 6 and 11 illustrate the operation of the pneumatic distributor under the action of the electro-magnet 53. The latter comprises a winding on a fixedly mounted iron core and body 159, the armature 153 being pivotally mounted at 157 on a fixed frame part 100. The armature 153 is articulated at 158 to the rod 111 of a double piston valve 112 which controls admission of compressed air to respective ends of the cylinder 11 by way of the conduits 113, and 114. In the conduit 114 there is a valve 118 which will be referred to later. In the illustrated down position of the piston valve 112, the conduit 113 opening into the right-hand end of the cylinder 11 is in communication with the compressed air admission 116 (the compressed air supply pipe is not shown) and the conduit opening into the left-hand end of the cylinder 11 is in communication with a vent 165 to atmosphere. The aforesaid valve 118 is adapted for uncovering this vent under exhaust conditions and for closing it under pressure of compressed air when admitted to the conduit 114. When the armature 153 is attracted to the magnet 53 upon closing of the contacts 121 under the pedal 1, the piston valve 112 is raised to its upper position wherein it opens the conduit 113 to an exhaust opening 165A and closes said conduit against the admission 116. At the same time it puts the admission 116 in communication with the conduit 114. The right hand end of the cylinder 11 is now exhausted through 165A and the left hand end is put under pressure, the admission of pressure to the conduit 114 closing the valve 118 against the vent 165. The pressure against the left hand face of the piston 12 moves the latter to the right against the resistance of the spring 63, so that the rod 14 turns the crank arm 55 clockwise. The similar turning of the eccentric 64 in the eye 65 causes the brake jaw 103 to move away from the suspender 22 to free the latter and permit the drop head 20 to fall.

When the pedal 1 is released, it opens the contact 121 so that the magnet 53 is de-energized. The armature 153 then falls and restores the piston valve 112 to the down position illustrated. The left-hand end of the cylinder is now put to exhaust and the right-hand end is put to pressure as already explained. The piston 12 is now restored to its leftward position, by the combined effects of the air pressure and the spring 63, the anticlockwise turning of the arm 55 and eccentric 64 being effective for causing the brake jaw 103 to move against the suspender 22. The latter is then gripped so that the drop head 20 is immobilized.

Turning again to the lifting mechanism, it will be seen in Figures 3 and 6 that the roller 23 is fixed but that its position can be adjusted by screws 33 operating against the bearings 34, Figure 3. These screws are rigidly connected with the bearings by keys 33A. Each of the screws 33, which cannot turn, advances or moves back by sliding freely in a frame part 161 under the action, on the one hand, of a nut 80 which can be held against turning by a tongue 81 (Fig. 4) fixed to the frame and engaging in peripheral notches 81A of the nut, and on the other hand by a nut 35 which can be prevented from turning by a lock nut 35A. This arrangement permits of adjusting the space between the rollers to suit the thickness of the suspender 22.

Figure 5:
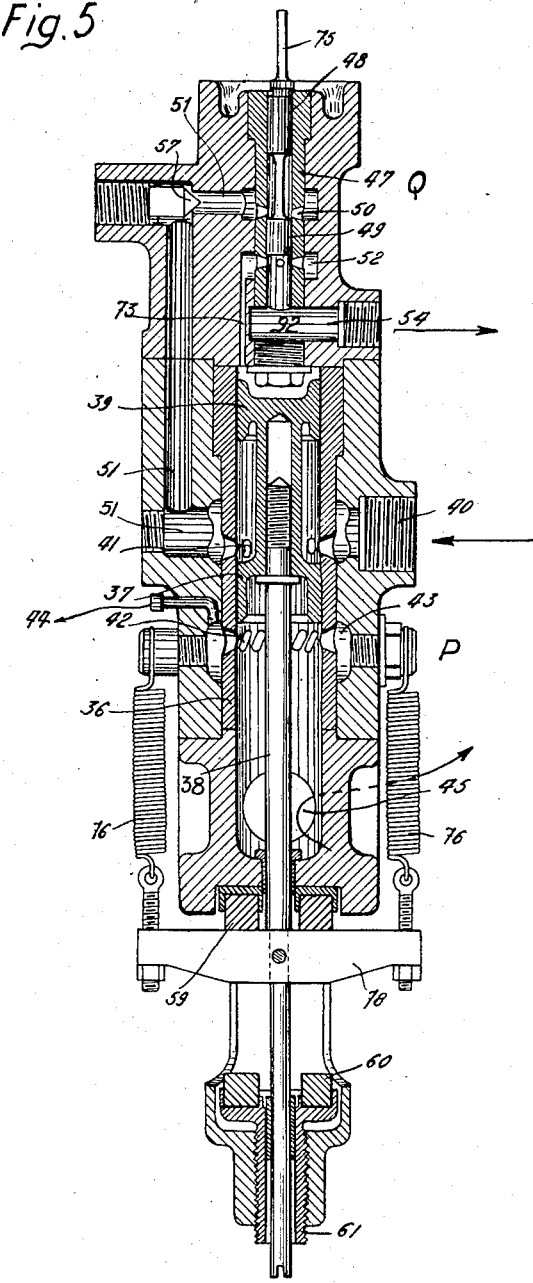
Figure 5 is a sectional view of the compressed air distributor.

The control mechanism of the pistons 16 connected with the bearings of the roller 24 is illustrated in Figures 5 and 6. The admission of compressed air to the cylinder 30 of the piston 16 (Figure 6) is controlled by a distributor P which is shown in detail in Figure 5, the said distributor itself being actuated by an electro-pneumatic servo-valve Q. The distributor P comprises a body 36 within which slides a rod 38 carrying two pistons 37, 39. The interior of the said body is in constant communication with a source of compressed air (not shown) by way of ports 41 and a pipe connection 40. It also communicates through ports 42 with an annular chamber 43 which is connected by pipe 44 with the admission to the cylinder 30. In the lower part of the body 36 there is an opening 45 which can be used for exhausting the cylinder 30.

In its upper position, seen in Figure 5, the piston 37 is above the ports 42 so that compressed air can escape from the cylinder 30 by way of the pipe 44, ports 42, and aperture 45. When the piston 37 is lowered to a position beneath the ports 42, the exhaust opening 45 is cut off and compressed air is admitted to the pipe 44 through the ports 42 from the cavity between the pistons 37, 39. The piston 16 is normally moved to the left in Figure 3 and to the right in Figure 6 by springs 18 acting against a cross head 83 but when the piston 16 is acted upon by the compressed air, the springs 18 are overcome and the piston forces the roller 24 towards the roller 23. When the cylinder 30 is exhausted the springs 18 immediately return the piston and move back the roller 24.

The pistons 37 and 39 of the distributor require for their movement a force greater than can be conveniently provided directly by electrical means such as a solenoid. The invention therefore provides the servo-valve Q which will be described with reference to Figure 5. This valve comprises a body 47 within which slides a double piston 48, 49 and within the body there are two series of ports 50 and 52. The first series 50 communicates by a duct 51 with the compressed air supply 40. The second series 52 communicates by way of a duct 73 with the upper part of the body 36, that is to say with the space above the piston 39. Finally, the lower part of the body 47 has an opening 92 which communicates with the outer air at 54.

The double piston 47, 39 is actuated by the servo-valve as follows: The rod 75 of the double piston 48, 49 is connected, as seen in Figures 6 and 11, to the core 212 of a solenoid 212A which is controlled by the contact devices 2, 3 and 4 as will appear. A spring 93 normally maintains the core 212, rod 75 and piston valve 48, 49 in the upper position illustrated. When the electro-magnet is energized, the core 212 is sucked down against the action of the spring and the rod 75 and piston valve 48, 49 are lowered from the position illustrated. In that position, particularly as seen in Figure 5, the compressed air admitted by the conduit 51 to the ports 50 finds no outlet. When the piston valve 48, 49 is lowered, however, the piston 49 decends beneath the ports 52, so that the compressed air between the pistons 48, 49 can then pass through the duct 73 and on to the upper face of the piston 39. The piston valve 39, 37 is thus depressed against the action of springs 76 and thus, as already explained, has the effect of admitting compressed air to the passage 44 and to the piston 16 for causing the latter to move the roller 24 against the suspender 22.

When the electro-magnet is de-energized, the core 212 is re-elevated by the spring 93 so that the piston valve 48, 49 returns to the position seen in Figure 5 and cuts off the compressed air from the piston 39 at the same time putting the upper face of the latter into communication with the vent 54 by way of the duct 73, ports 52 and space 92. The springs 76 acting upon a cross head 78 on the rod 38, serve for lifting the piston 37, 39 so that the piston 39 forces out the air by way of the route just mentioned.

In Figure 5, an adjustable cone valve 57 is fitted in the passage 51 for regulating the flow of compressed air to the ports 50. The crosshead 78 is keyed to the rod 38 and moves up and down between two stops 59 and 60, these being preferably of sound deadening material. The lower stop 60 is adjustable up or down by the screw 61 for adjusting the down stroke of the distributor 37, 39.

A further feature of the invention is that exhaust air from the cylinder 30 through the aperture 45 is conducted to the lower matrix 62 by a pipe 95, Figure 1, with a delivery orifice 96 adapted for blowing the air over the matrix 62. It will be noted that this blowing takes place at the moment when the rollers 23, 24 are separated, that is to say at the beginning of a fall of the head 20. There is thus an automatic timing of the blowing.

The electrical connections of the machine will now be described and in particular, those which permit of control of the solenoid 212A by the contact devices 2, 3 and 4. The installation is fed with current from any suitable source 98 connected to the terminals A, B, Figures 6 to 8. From the terminal A a conductor H leads to branch connections U and M. From U a conductor V leads to a fixed contact 58 of the contact device 2 and from M a conductor W leads to a contact of the pedal contact device 121. The second contact of the device 121 is connected by a conductor X with the winding of the electromagnet 53 to feed the latter with current when the device 121 is closed, a return connection from the said winding being made by a conductor Y connected to the terminal B. From a flexible blade contact 56 of the contact device 2 a conductor R is taken to one terminal E of the winding of the electro-magnet 212A, the return connection from the latter being a conductor C connected at Z to the return conductor Y. The conductor R is branched at E in which branch there is a gap which can be closed by a maintaining contact 124 carried by the core 212 and from this gap there extends a conductor F which leads to one of two fixed contacts of a pedal contact device 123 the purpose of which will be described later. At a point G in the conductor F a branch K is taken to a fixed contact 56 of the contact device 3.

From the other fixed contact of the pedal contact device 123 there extends a conductor I which leads to a flexible blade contact 56 of the contact device 4. From a point L in the conductor I a branch N leads to a flexible blade contact 56 of the contact device 3. The fixed contact 58 of the contact device 4 is connected by a conductor O to the junction M and so through H to the terminal A.

The operation of the contact devices 2, 3 and 4 will be described with reference to Figures 12, 13, 14 and 15. As already noted, each device comprises a movable and flexible blade 56 and a fixed contact 58 each connected to a respective conductor. The operation is somewhat different when the devices 3 and 4 are operated by the finger 21 of the head 20 during raising of the latter as compared with that when the device 2 is operated by the finger 21 near to the end of the drop.

The contact devices 3 and 4 have the arrangement seen in Figures 12 and 13. One wire N is connected, as by soldering, at 77 to the blade 56. In repose the blade 56 rests upon the contact 58. When the head 20 descends, the finger 21 engages the blade 56 from above (position I, Figure 12). With the continued descent, the finger 21 downwardly flexes the blade 56 to the dotted line position II, Figure 12, whereupon the blade escapes from the finger and resumes the full line position. When the head rises again, the finger 21 comes first to a position III, Figure 13, beneath the blade 56 and then to position IV in which it engages the underside of the blade. It then raises the blade to position V so that the blade 56 disengages from the contact 58, thereby breaking the connection. Immediately after rising above the position V, the finger 21 slips past and releases the blade 56 which thereupon returns to its fall line position in which it again makes contact with 58. The contact device is now ready for a repetition of the sequence.

The contact device 2 is mounted and operates in a different manner. In the position of repose the blade 56 is away from the fixed contact 58 and may be supported in that position by a spring 79, for example, fixedly mounted at 100A to the machine frame 100. When the head 20 descends, the finger 21 comes upon the blade 56 from above (position I, Figure 14) and in continuing the descent it depresses and flexes the blade and the spring 79, so that the blade makes contact with the fixed contact 58 (position II). The descent continues until position III is passed when the finger 21 slips past the blade 56 which then resumes its full line position in which it breaks contact. When the head 20 again rises, as in Figure 15, the finger 21 comes against the blade 56 from below (position IV, Figure 15) and then raises the blade to position V after which the finger slips past the blade which is then free to come to rest again upon the spring 79.

Figure 7:
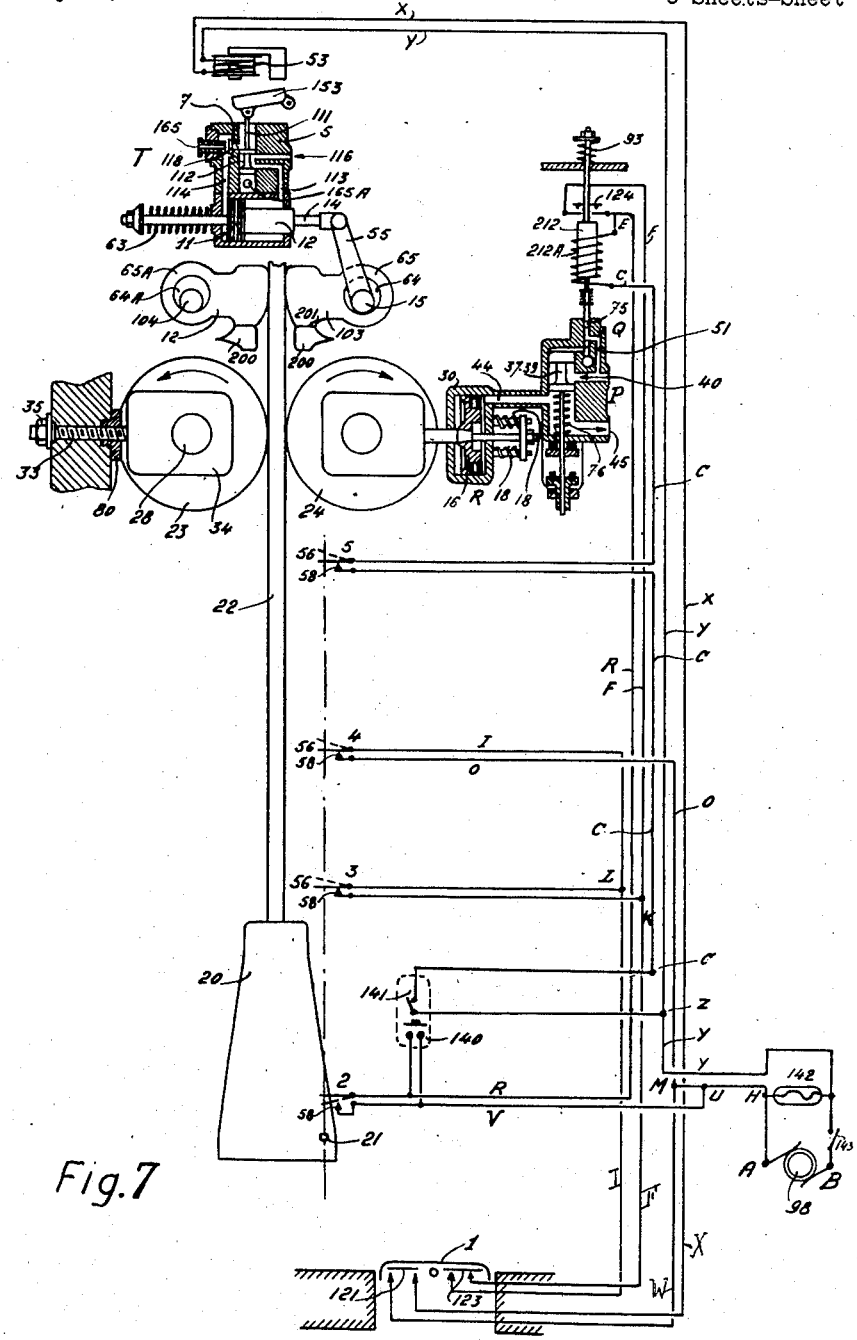
Figure 7 is similar to Figure 6 but illustrates a variant comprising also various auxiliary devices for safety and hand control.
Figure 8:
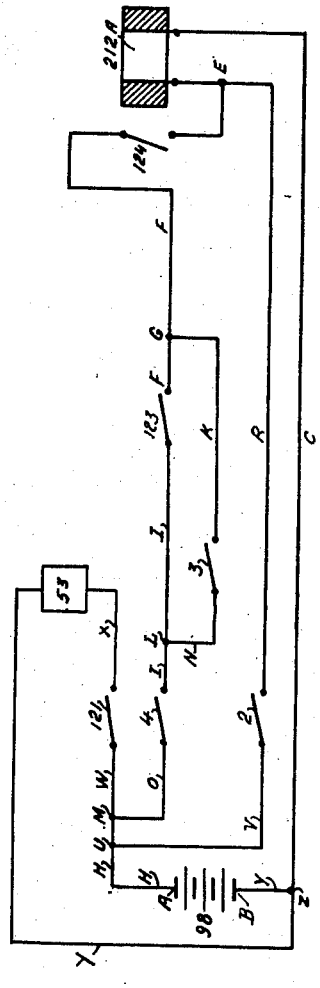
Figure 8 is a diagram of electro-connections for the arrangement in Figure 6.

In Figures 6 to 8, it will be noted that the contact device 3 is connected by wires N and K to the points L and G in shunt with the contact device 123. Also, that during ascent of the head 20 the contact device 3 is opened before the contact device 4. If therefore the contact device 123 is closed by the operator, the opening of the contact device 3 by the finger 21 during such ascent will be without effect since the circuit between L and G will continue to be made by the contact device 123. The circuit between M and E will therefore be interrupted only when the finger 21 opens the contact device 4 so that the solenoid winding 212A will be de-energized only when the finger 21 reaches the contact device 4. But if the contact device 123 is opened by the operation, the opening of the contact device 3 by the ascending finger 21, will interrupt the circuit between L and G so that the winding 212A will be de-energized.

The operation of the machine is as follows:
When the operator depresses the pedal 1 and closes the contact 121, current flows from A via wire H, junction M, wire W, contact 121, and wire X to the winding 53, returning to B by wire Y. The armature 153 is then attracted with the result that the pneumatic mechanism causes the jaw 103 to move away from and release the suspender 22 as hereinbefore described. The drop head 20 then falls. In its descent past the contact devices 4 and 3 it produces no action and these devices remain closed as has been explained with reference to Figure 12. The finger 21 then reaches the contact device 2 and closes this as has been explained with reference to Figure 14 and then descends further to permit the contact device 2 to open. During the short period of closure of the contact device 2 a circuit is established from A via wire H, junction U, wire V, contact device 2, wire R, and point E to winding 212A, the return being by way of wire C, junction Z and wire Y to B. Consequently, the solenoid is energized and sucks down its core 212 so that the piston 16 is pneumatically displaced, owing to the action of the servo valve Q of the distributor P, in such manner as to cause the suspender 22 to be nipped between the rollers 23 and 24 whereupon the head 20 is again raised. However, by reason of the inertia of the mechanism and of the mass of the head 20, the ascent of the head 20 commences only when the finger 21 has passed beneath the contact device 2 by an appreciable amount, for example as shown in Figure 6. In practice, the height of the contact device 2 is adjusted on the slide 71 in such manner that the ascent of the head 20 under the influence of the rollers 23 and 24 commences at the precise moment when there is cessation of the rebound caused by the die 162 coming upon the matrix 62 (Fig. 1). All loss of energy is then avoided. At the same time that the core 212 of the solenoid acts upon the rod 75 of the servo valve Q, it also closes the maintaining contact 124. The circuit for the winding 212A is then from A via wire H, junctions U and M, wire O, contact device 4 (closed), wire I, junction L, wire N, contact device 3 (closed), wire K, junction G, wire F, contact 124 and point E to the winding 212A, the return being by way of wire C junction Z, and wire Y to B. The solenoid therefore remains energized when the finger 21 has passed beneath the contact device 2 and the latter has reopened as in the full line position in Figure 14. The rollers 23 and 24 will therefore continue to raise the head 20.

Two cases have now to be considered. In the first, the contact 123 has been opened by the operator. In this case, the opening of the contact device 3 by the finger 21 during the ascent of the head 20 breaks the excitation circuit of the winding 212A. The core 212 then rises and through the servo-valve Q and distribution P causes the piston 16 to be moved so as to separate the roller 24 from the roller 23. As the brake 102, 103 is always disengaged (whilst the operator continues to maintain the contact 121 closed) the head 20 falls by its own weight from the intermediate height. At the same time the maintaining contact 124 is opened by the rising of the core 212 and the cycle above described recommences.

If, on the contrary, the contact device 123 is closed by the operator, the excitation circuit of the winding 212A is not broken when the finger 21 in rising engages and then clears the contact device 3 as has been explained above. Only when the finger 21 reaches the contact device 4 is the circuit of 212A broken. At this moment the rollers 23, 24 separate as already explained and the head 20 falls from the greater height.

It will be seen therefore that accordingly as the operator closes or opens the contact 123, the head 20 will fall from the greater height or from an intermediate height for the striking of heavy or light blows.

Figure 10:
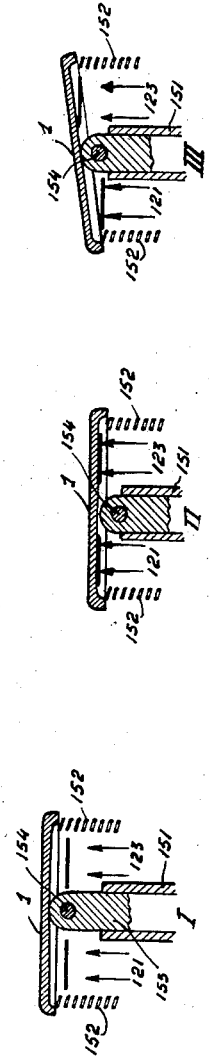
Figure 10 is a detail sectional view of a control pedal, the latter being shown in three different positions.

In one advantageous construction according to the invention, the contacts 121 and 123 are grouped, as in Figure 10, under one and the same pedal 1. The pedal is pivotally mounted at 154 on a rod 155 which can move vertically in guides 151. This pedal is pressed upwards by springs 152 to its position of rest. In this position (position I) the contacts 121 and 123 are both open. When the pedal is depressed in the horizontal position so that both of the springs 152 are compressed both of the contacts 121 and 123 are closed (position II). When the pedal is inclined about the axis 154 so that one of the springs 152 is compressed more than the other (position III) the contact 121 is closed and the contact 123 remains open. In position II (pedal depressed with the foot horizontal) 121 and 123 are both closed so that the machine functions with heavy blows. In position III (pedal depressed with the foot inclined) 121 is closed and 123 remains open. The machine then operates with light blows.

It will be seen that a simple inclination of the foot of the operator pressing upon the pedal 1 permits at will, of passing from heavy blows to light blows or inversely.

Figure 9:
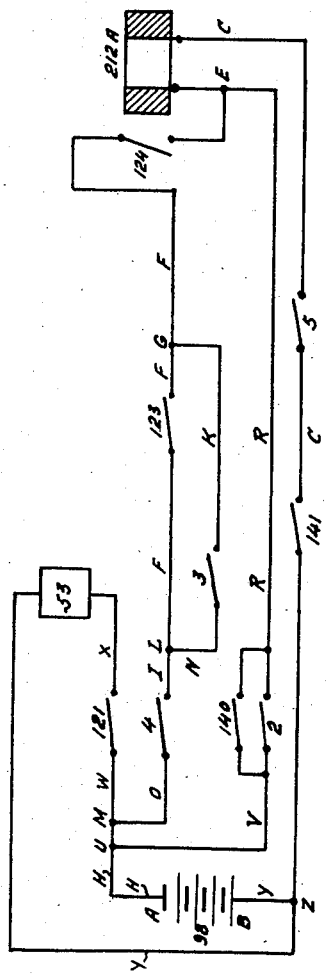
Figure 9 is a similar diagram for the arrangement in Figure 7.

Figures 7 and 9 illustrate a machine further improved by the inclusion of a safety contact device 5 which is adjustable as to height and is intended to avoid accidents in the event that the contact devices 3 and 4 do not function. This contact device is inserted in the wire C and prevents the head 20 from further rising. Figures 7 and 9 illustrate, moreover, contact devices 140 and 141 which permit of causing the head 20 to rise and fall at will, for example for the purpose of putting the matrices in place. The contact device 140 is connected between the wires V and R so as to shunt the contact device 2. When the contact device 140 is closed, the rollers 23, 24 nip the suspender 22 between them and maintain the nip just as when the contact device 2 has been actuated by the finger 21.

The contact device 141 is inserted in the wire C in series with the contact device 5. Consequently, opening of the contact device 141 has the same effect as the opening of the contact device 5, the winding 212A being de-energized and the rollers 23 and 24 moved apart. Normally, the contact device 141 is closed and 140 is open.

The motors which drive the rollers 23, 24 being assumed to be at rest and the head 20 being held stationary by the brake jaws in an elevated position, it is possible by closing the contact device 140 by hand to cause the roller 24 to close the nip on the suspender 22. By then closing the contact device 121 of the pedal 1, the head 20 can be caused to descend very slowly, the undriven rollers 23, 24 braking the descent until the die 162 comes upon the matrix 62. When the descent has terminated, the contact device 141, which is normally closed, is opened by hand and this cuts out the winding 212A and brings about separation of the rollers 23, 24. The contact device 141 is then closed again. By then putting the motors in operation again for driving the rollers 23, 24 and closing the contact device 140, the said rollers are again caused to come together for elevating the head 20. It is useless to close the contact device 121 during this elevation because the brake jaws, during the rising of the head 20, can remain in the closed position. In effect, the suspender 22, moved upwards by the rollers, automatically opens the brake by reason of the form of the jaws 102, 103 seen in Figures 6 and 7. These jaws open out downwardly in such manner that they lose their grip when the suspender 22 moves upwardly and regain their grip when the suspender ceases its upward movement and tends to descend.

It is possible also to cause the head 20 to descend and ascend as desired whilst the motors driving the rollers 23, 24 are in operation. For the descent, the contact device 141 is opened to annul the effect of the contact device 2 when the head 20 passes it and the contact device 121 is then given a series of short closures. This causes a succession of disengagements of the brake and permits the head 20 to descend in steps until the die comes upon the matrix.

For re-elevating the head 20 to a desired height, also by steps, it is only necessary to close the contact device 141 and then bring about the ascent of the head 20 by pressing an instant upon the button of the contact device 140. The movement can be arrested by opening the contact device 141.

During the working of the machine an indicator device or lamp 142 (Figure 7) shows, if desired, when the electrical part of the machine is under tension. A cut-out 143, Figure 7, permits of cutting off the feed of current when desired.

Although in the foregoing it has been arranged for the contact device 123 to be actuated by the same pedal 1 which actuates the contact device 121 this arrangement is not indispensable. It is possible to actuate the contact device 123 independently of the pedal 1 either by the foot which actuates that pedal, or by any other means as for example by the other foot or by a knee.

What I claim is:

1. Drop hammer comprising in combination a lower matrix enclosing the work piece to be stamped, a head carrying the die and adapted for falling vertically to strike the matrix, a suspender attached to the head, brake means operative against the suspender, two continuously driven rollers on respective sides of said suspender, a first pneumatic means operative for engaging and disengaging the brake means, a second pneumatic means operative simultaneously upon the rollers for applying them against the suspender or for dis-engaging them therefrom, a source of electric current, first and second electrical windings fed from the said source and each controlling one of the said pneumatic means, a manually operated contact device between the said source and the first electrical winding, a lower contact device normally open and two upper contact devices normally closed said upper contact devices being superposed in the vertical path of travel of the head at adjustable heights and inserted electrically between the source of current and the second winding, means responsive to a vertical effort from above but unresponsive to a vertical effort from below for closing the lower contact device, means responsive to a vertical effort from below but unresponsive to a vertical effort from above for opening each of the upper contact devices, means fixed upon said head and adapted for co-operating with the said responsive means during descent of the head, for temporarily closing the lower and normally open contact device and for opening temporarily and successively, during ascent of the head, each of the normally closed upper contacts, first means actuated by the closing of the lower and vertically adjustable contact device for maintaining the current in the second winding after the subsequent opening of the said contact device, second means actuated by the opening of one or the other vertically adjustable upper contacts for releasing the first means, and a switch actuated by the operator in shunt with the lower of the two upper contact devices.

2. Drop hammer as claimed in claim 1, wherein the second winding, when energized by the closing of the lower contact device, closes a maintaining contact in the circuit of which are placed in series the two upper displaceable contacts.

3. Drop hammer comprising in combination a matrix for the work piece, a drop head for striking the said matrix, slides for guidance of the said drop head, a suspender attached to said drop head, a brake jaw fixed adjacent to said suspender, a second brake jaw movably mounted adjacent to said suspender, a first piston movable in a cylinder for controlling said second brake jaw, a source of compressed air, a distributor controlling communication between said source and one extremity or the other of the cylinder, an electrical winding, an armature for said winding said armature being connected with said distributor, a first roller mounted near to one side of said suspender, a second roller mounted near to the other side of said suspender, means for continuously driving said rollers, a movable bearing for the second roller, guides for guiding displacement of said bearing perpendicularly to said suspender, a rod connecting this bearing to a second piston movable in a cylinder, a spring operative for pressing this second piston towards one extremity of its cylinder, a second distributor controlling communication of the said cylinder extremity with the source of compressed air or with the atmosphere, a second electrical winding, the armature of which is connected with the second distributor, a source of electric current, electrical connections between the said source of current and the two windings, a first manually operated electrical contact interposed between the source of current and the first relay winding, three second vertically adjustable contact devices superposed in the vertical path of travel of said head and inserted in the electrical connections feeding the second relay winding, the lowest of these three contacts being normally open and the upper two being normally closed, a projection upon said head co-operating with each of the three second contact devices for closing during its descent the normally open contact and for opening successively during its ascent the normally closed contacts, and a manually operated switch in shunt with the intermediate one of the three second contact devices.

4. Drop hammer according to claim 1, wherein the manually operated contact device controlling the braking means and the manually operated switch shunting the lower one of the upper contact devices are placed each under a respective extremity of one and the same control pedal which on the one hand is tiltable about an axis and on the other hand is guided vertically.

5. Drop hammer according to claim 4, wherein the lower contact device actuated by the drop head in the neighbourhood of the bottom of its stroke is shunted by a manually operated contact device and wherein another manually operated contact device is connected in series between the sources of current and the second electrical winding.

GEORGES HARTEMANN.

REFERENCES CITED

The following references are of record in the file of this patent:

UNITED STATES PATENTS

| Number | Name | Date |
|---|---|---|
| 1,311,942 | Aldridge et al. | Aug. 5, 1919 |
| 1,724,635 | Bath | Aug. 13, 1929 |
| 1,899,371 | Waldron | Feb. 28, 1933 |
| 1,954,155 | Vlchek | Apr. 10, 1934 |
| 1,957,021 | Schneider | May 1, 1934 |
| 2,252,314 | Criley | Aug. 12, 1941 |